United States Patent [19]

Saito

[11] Patent Number: 5,758,617

[45] Date of Patent: *Jun. 2, 1998

[54] ROTARY ENGINE

[75] Inventor: Hiroshi Saito, Yachiyo, Japan

[73] Assignee: Saitoh & Co., Ltd., Yachiyo, Japan

[*] Notice: The terminal 19 months of this patent has been disclaimed.

[21] Appl. No.: 310,714

[22] Filed: Sep. 22, 1994

[51] Int. Cl.[6] .................... F02B 53/00; F02K 7/02
[52] U.S. Cl. .................... 123/243; 418/266; 60/247
[58] Field of Search .................... 60/39.44, 247; 123/243; 418/148

[56] References Cited

U.S. PATENT DOCUMENTS 3,762,375  10/1973  Bentley ........................ 123/243

FOREIGN PATENT DOCUMENTS

| 289644 | 11/1988 | European Pat. Off. | 123/243 |
| 456996 | 7/1913 | France | 60/39.44 |
| 17706 | 8/1913 | France | 60/39.44 |
| 999836 | 10/1951 | France | 123/243 |
| 1345300 | 10/1963 | France | 123/243 |
| 515189 | 2/1955 | Italy | 60/39.44 |

OTHER PUBLICATIONS

"The American Inventor", vol. XV, No. 4, 1906, p. 101.

*Primary Examiner*—Michael Koczo
*Attorney, Agent, or Firm*—Trexler, Bushnell, Giangiorgi & Blackstone, Ltd.

[57] ABSTRACT

A rotary engine is disclosed having a rotor and rotor housing for mounting therewithin said rotor for its rotation within the inner wall of the rotor housing, the gap between the rotor and the inner wall of the rotor housing defining the engine room. A plurality of telescopic sealing blades which can elongate and shorten with respect to the rotor are attached, respectively at positions substantially equally spaced on the circumference of said rotor so that the sealing blades elastically contact to the inner wall of the rotor housing, the sealing blades sliding along the inner wall of the rotor housing during the rotation of the rotor and separating the engine room in an airtight manner so that the suction of fuel gas, its succeeding compression and the exhaust of burnt gas are carried out.

8 Claims, 9 Drawing Sheets

ROTARY ENGINE

FIELD OF THE INVENTION

This invention relates to an internal combustion engine, and more particularly to a rotary engine which can provide a high engine torque output even in a lower engine rotation state.

BACKGROUND OF THE INVENTION

In general, there are two types of internal combustion engines, one being a reciprocating engine in which a piston performs linear strokes, and the other being a rotary engine in which the piston performs rotary motion.

The rotary engine includes a rotor operatively engaged with an engine output shaft, and a rotor housing accommodating therewithin the rotor. In a typical rotary engine, the rotor acting as a rotating piston is adapted to perform eccentric rotary motion within the rotor housing, in such a way that the engine output shaft is provided with an external toothed gear which engaged with the internal toothed gear of the rotor which is larger in diameter than the external gear of the engine output shaft so that the eccentric rotation of the rotor is transmitted to the engine output shaft. The outline of the cross-section of the rotor sliding inner surface of the rotor housing is shaped to a substantially cocoon-shaped peritrochoid curve, and the cross-section of the rotor is shaped to a substantially equilateral triangle. The three vertex portions of the rotor slides on the peritrochoid curved inner surface of the rotor housing during the eccentric rotation of the rotor to form separate and independent compartments for suction, compression, explosion and exhaust, respectively within the engine room between the rotor and the inner surface of the rotor housing. Such prior art typical rotary engine avoids problems relating to the use of a suction valve and an exhaust valve related to the engine room, which are necessary for the reciprocating engine.

In such typical rotary engine, during one rotor eccentric revolution, only one sequence of suction, compression, explosion and exhaust is carried out, and therefore there is such disadvantage that a high engine torque is not obtainable unless the operation of the engine becomes a high rotation speed. This disadvantage also exists in the case of the reciprocating engine. Further, a complicated mechanism is needed to cause the rotor to rotate eccentrically with respect to the engine output shaft, which results in increase in cost.

SUMMARY OF THE INVENTION

Therefore, an object of this invention is to eliminate the above-mentioned disadvantages of the prior art internal combustion engines and provide an improved rotary engine by which it is possible to output a high engine torque even at the time of a low engine rotation state.

Another object of this invention is to provide the rotary engine of which operational mechanism is very simple in comparison with the prior art rotary engine.

Yet another object of this invention is to provide the rotary engine which is easily applicable to a jet propulsion engine.

Summarily stated, a rotary engine according to this invention comprises a plurality of spokewisely arranged telescopic sealing blades attached at equally spaced positions on the circumference of a circular-cylinder-like rotor which is rotatably mounted within a rotor housing having a rotor housing inner wall facing to the circumference of the rotor, the gap between the circumference of said rotor and said inner wall of said rotor housing defining the engine room of the rotary engine, said sealing blades being elastically pressurized toward the inner wall of a rotor housing to slide along the rotor housing inner wall surface with sealingly contact thereto over a whole revolution of the rotor, and said sealing blades dividing the engine room into the plurality of compartments. Each of said sealing blades includes a sealing blade case contained in said rotor with it being spring biased in the radial direction with respect to the rotor, and a sealing blade body contained in said sealing blade case with it being spring biased toward said rotor housing inner wall with respect to the sealing blade case. The sealing blade case may include a plurality of sealing blade case parts assembled into a telescopic construction in which they are spring biased with respect to each other, said sealing blade case parts including an inner sealing blade case part supporting said sealing blade body contained therein spring biased with respect to said inner sealing blade case part, and an outer sealing blade case part supporting said inner sealing blade case part contained therein spring biased with respect to said outer sealing blade case part. As a sealing blade slider along the rotor housing inner wall within the engine room, fuel mixture is sucked through a gas mixture suction port in an space at the downstream side of that sealing blade. In order to suck fuel mixture gas as much as possible, it is desirable that the sealing blade is expanded or elongated as long as possible. Next, after a following sealing blade has passed through the gas mixture suction port, fuel gas which has accommodated within these two sealing blades is gradually compressed by the contraction of these sealing blades as they slide the inner wall of the rotor housing. When the two sealing blades become a minimum expansion condition, that is the maximum contraction condition, the fuel gas which has accommodated within these two sealing blades is brought into an engine combustion room, and at that time the explosive combustion of the fuel gas is carried out by firing by means of a sparking plug within the engine combustion room. The rotor is provided with a notch between two adjacent sealing blades. Therefore, the number of the notches provided in the rotor is the same of the number of the sealing blades attached to the rotor. The engine combustion room preferably may be defined by an arced circular portion of the rotor housing inner wall, at which both circumferential ends said two sealing blades are made to become their maximum contraction, and the notch between these two sealing blades.

In accordance with the very important characteristic feature of this invention, it includes means for producing burnt gas blast directed along one direction during the explosion cycle of the engine, and a burnt gas pressure bearing surface formed by a wall defining said notch which is substantially normal to the direction of the burst gas blast to efficiently convert it into rotational energy for the rotor. The means for producing burnt gas blast includes a blast guide hole formed in the rotor housing and a sparking plug mounted at the end at which said blast guide hole is terminated, said blast guide hole having its length from said end to the position of the hole from which the blast goes out, which is enough for the blast to be directed along said one direction. The surface at the end of said blast guide hole at which said sparking plug is mounted has a substantially parabolic shape of which focal point is positioned substantially to the sparking point of said sparking plug.

Other objects, features and advantages of the invention will become apparent from a reading of the specification, when taken in conjunction with the drawings, in which like reference numerals refer to like elements in the several views.

DESCRIPTION OF THE PREFERRED EMBODIMENTS

Figure 1:
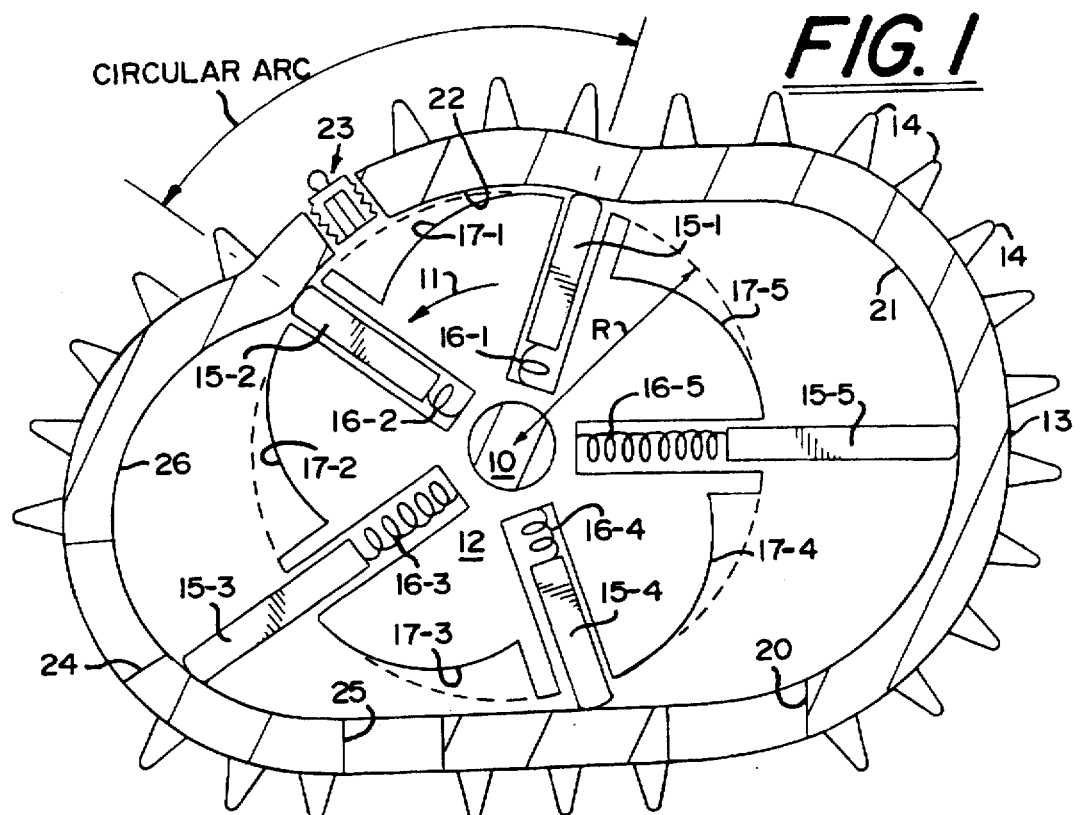
FIG. 1 is a theoretical explanation view of one embodiment of the rotary engine according to this invention, in which the rotor has five sealing blades.

FIG. 1 shows one embodiment of the rotary engine according to this invention by the cross section view taken along a plane perpendicular to an engine output rotary shaft 10. A column-like rotor 12 is fixedly attached to the rotary shaft 10. The rotor 12 is adapted to rotate around the axis of the rotary shaft 10 together therewith in the direction shown by an arrow 11, inside a rotor housing 13 which is provided with a large number of outside radiator fins 14. The output rotary shaft 10 is rotatablly supported through suitable airtight bearing means (not shown), and both side portions of the rotor 12 are contacted to the inner side surfaces of the rotor housing in an airtight condition. As is shown, the rotor housing 13 has an inner wall defining an internal engine room within which the rotor 12 is rotated. The circumference of the rotor 12 or the circumference face of the rotation locus of the rotor 12 faces to the inner wall of the rotor housing 13.

In the embodiment shown in FIG. 1, the rotor 13 describes the cylindrical rotation locus of radius r, and along its circumference, five telescopic sealing blades 15-1, 15-2, 15-3, 15-4 and 15-5 which will be described in detail hereinafter are positioned at an equally spaced relationship. These sealing blades are elastically attached to the rotor 12 through respective spring means 16-1, 16-2, 16-3, 16-4 and 16-5 so that the respective sealing blades can be elastically biased toward the inner wall surface of the rotor housing 13. The sealing blades themselves can elongate and shorten. Preferably, the direction of the expansion or elongation and contraction or shortening of each of the sealing blades is substantially radial with respect to the rotation axis of the rotor 12. During a revolution of the rotor 12, the sealing blades 15 slide along the inner wall surface of the rotor housing 13 with airtight engagement therewith, so that five compartments are always formed in such way that adjacent two sealing blades divide an engine room defined by the rotor 12 and the inner wall of the rotor housing 13. The rotor 12 is provided with notches 17-1, 17-2, 17-3, 17-4 and 17-5 each of which extends in the axial direction and has its curved portion of which depth increases in the rotating direction of the rotor 12 and its raising-up portion positioned at the end of the curved portion and extending substantially radially. This raising-up portion of the notch acts as a burnt gas pressure bearing surface as will be described in detail hereinafter.

In the operation of the embodiment of the rotary engine shown in FIG. 1, after a sealing blade passed through a fuel mixture gas suction port 20 provided in the rotor housing 13 and until a next sealing blade passes through the mixture suction port 20, as the result of the fact that negative pressure is produced at the side of the first sealing blade downstream in the rotating direction of the rotor 12, fuel mixture is sucked up through the mixture suction port 20 into the engine compartment defined by the above-mentioned first and second sealing blades. In this suction engine cycle, it is desirable to suck fuel mixture as much as possible. The first sealing blade elongates or expands gradually during this suction period. The suction engine cycle is finished when the second succeeding sealing blade has passed through the mixture suction port 20. Then, the fuel mixture which has been sucked and accommodated between these two sealing blades in the suction engine cycle must be compressed during the following engine compression cycle. This compression is carried out by the fact that the sealing blades gradually contract in the radial direction as the rotor 12 rotates. That is, during this compression period, as the rotor 12 rotates, the two sealing blades are gradually inserted into the rotor 12 by the sliding thereof along the inner wall of the rotor housing 13 to decrease the volume of the sucked and accommodated fuel mixture.

For example, in the condition shown in FIG. 1, after the sealing blade 15-4 rotated by a little degree and passed through the suction port 20, the mixture gas of air and petroleum-fuel which has been accommodated between the sealing blade 15-4 and the preceding sealing blade 15-5 is gradually compressed since the distance between the inner surface section 21 of the rotor housing 13 and the axis of the rotor 12 is gradually decreased. In the position state of the sealing blades 15-1 and 15-2 in FIG. 1, the volume of fuel gas between these sealing blades is made minimum. To this end, a circular arc portion 22 is formed on the inner wall of the rotor housing 13 of which radius is substantially equal to the radius r of the rotor 12. Therefore, when the two adjacent sealing blades are positioned on this arc portion 22, the sealing blades are in the minimum expansion condition, that is the maximum contraction condition, and therefore the mixture is compressed to the maximum level.

In the condition shown in FIG. 1 in which the sealing blades 15-1 and 15-2 are in the minimum expansion state, the fuel mixture therebetween exists substantially within the notch 17-1 between these sealing blades in the maximum pressure state. At that time, ignition is made by means of a spark plug 23. In accordance with this invention, in order that at the time of explosion due to the ignition combustion gas pressure produced thereby is made to be converted into rotational energy for the rotor 12 with high efficiency, the respective notch 17 of the rotor 12 which mainly forms the combustion engine room is provided with the above-mentioned raising-up portion. Therefore, the raising-up portion of the notch 17 acts as a combustion gas pressure bearing portion. Preferably, the spark plug 23 is positioned adjacently to the raising-up portion of the notch at the time of the explosion. After an advanced sealing blade came into the arc section and then a following notch comes into the arc section, filling of fuel gas between this advanced sealing blade and the next sealing blade into the notch sandwiched between these sealing blades is started. As the advanced sealing blade slides along the arc section of the inner wall of the rotor housing, the pressure of the fuel mixture is increased gradually. When the advanced sealing blade is positioned at the left end of the arc section and the succeeding sealing blade is at the right end of the arc section (the illustrated condition by sealing blades 15-2 and 15-1 in FIG. 1), the pressure of the fuel mixture becomes the maximum level, and at that time, ignition by means of a spark plug 23 is executed. Therefore, the space of the notch 17-1 which is in the illustrated position in FIG. 1 constitutes an engine combustion room.

The circumferential length of the arc portion 22 is preferably selected to be slightly larger than the angular distance between the two adjacent sealing blades (sealing blades 15-1 and 15-2). In this invention, it is preferable that the radius of the rotation of the rotor 12 is substantially equal to the radius of the circular arc section of the inner wall of the rotor housing 13. As a result, the sealing blades positioned on the arc section are pushed in to the level of the surface of the rotor. When the two adjacent sealing blades are in the shortened condition shown by the sealing blades 15-2, 15-1 in FIG. 1, surface seals are formed between the positions on the rotor around the two respective sealing blades and the corresponding engaged portions on the inner wall of the rotor housing. This arrangement avoids problems relating to emission of unburned hydrocarbons resulting from large crevice volumes created by the prior art apex seals.

In the illustrated state by the sealing blades 15-2 and 15-1 in FIG. 1, the notch 17-1 and the arc section 22 determining the notch space define the combustion room of the engine. As will be also explained in connection with FIG. 14, in this invention, in order to provide effective energy conversion of the pressure of burnt gas upon explosion within the engine combustion room into rotational energy for the rotor, the notch 17 defining the engine combustion room together with the arc section of the inner wall of the rotor housing is provided with the above-mentioned combustion gas pressure bearing portion. Preferably, the spark plug 23 is positioned adjacent to the combustion gas pressure bearing portion at the time of the explosion.

In the illustrated embodiment, burnt gas produced by the explosive combustion of the fuel mixture within the combustion engine room is diffused speedily within a pressure diffusion engine room, whereby the rotation of the rotor 12 is made more effective. During the combustion gas pressure diffusing cycle of the engine, the preceding sealing blade 15-2 starts to expand quickly from the illustrated explosion position so that the volume defined by the sealing blades 15-2, 15-1 and the inner wall 26 of the rotor housing 13 is correspondingly increased. When and after the preceding sealing blade 15-2 passed through a combustion gas exhaust port 24, the combustion gas is exhausted through the exhaust port 24. An auxiliary exhaust port 25 may be provided if necessary. The exhaust cycle continues until the following sealing blade 15-1 has passed through the auxiliary exhaust port 25. Since the pressure diffusion engine room is not essential in this invention, the pressure diffusion cycle may be omitted.

It should be appreciated from the above-mentioned explanation of the construction and operation of the illustrated embodiment of this invention that in this invention during a revolution of the rotor 12 the ignition, that is explosion is carried out by the number of the notches, that is the number of the sealing blades provided on the rotor 12. That is to say, it is apparent that in this invention the sequence of the intake, compression, explosion and exhaust engine cycles is executed repeatedly by the number of the sealing blades of the rotor 12 during one revolution of the rotor.

Figure 2:
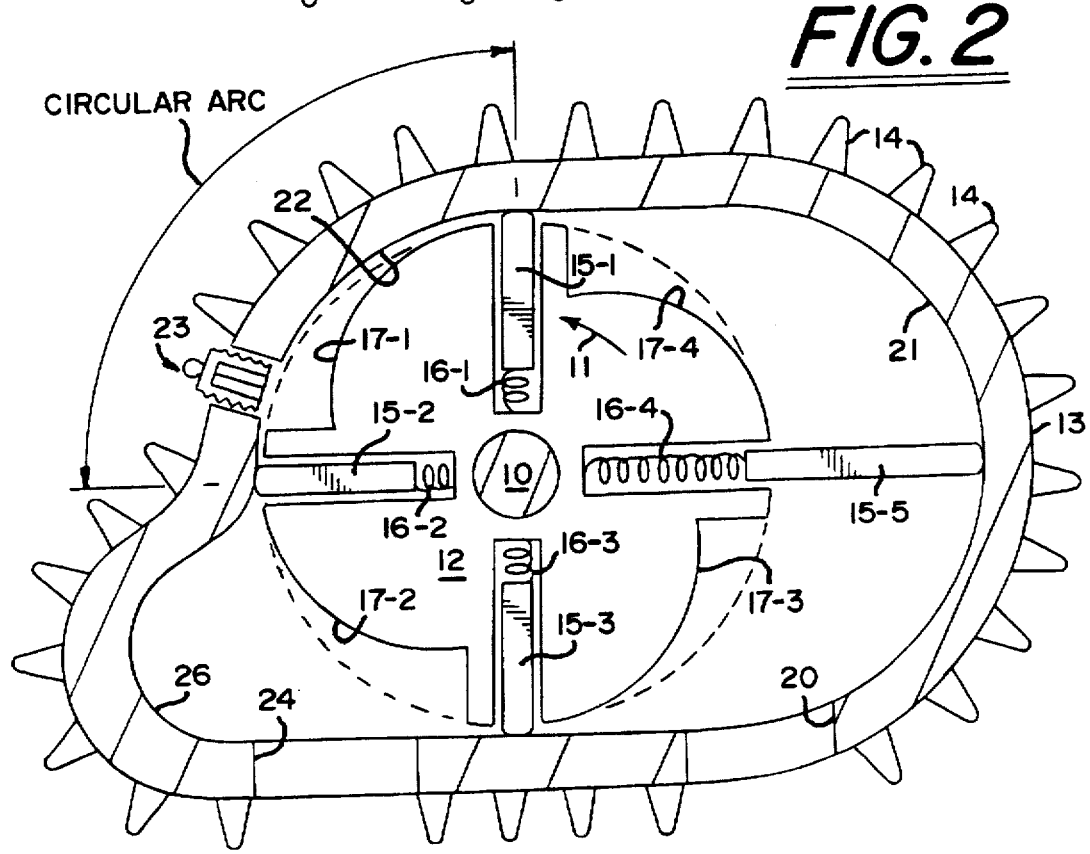
FIG. 2 is a theoretical explanation view of another embodiment of the rotary engine according to this invention, in which the rotor has four sealing blades.
Figure 3:
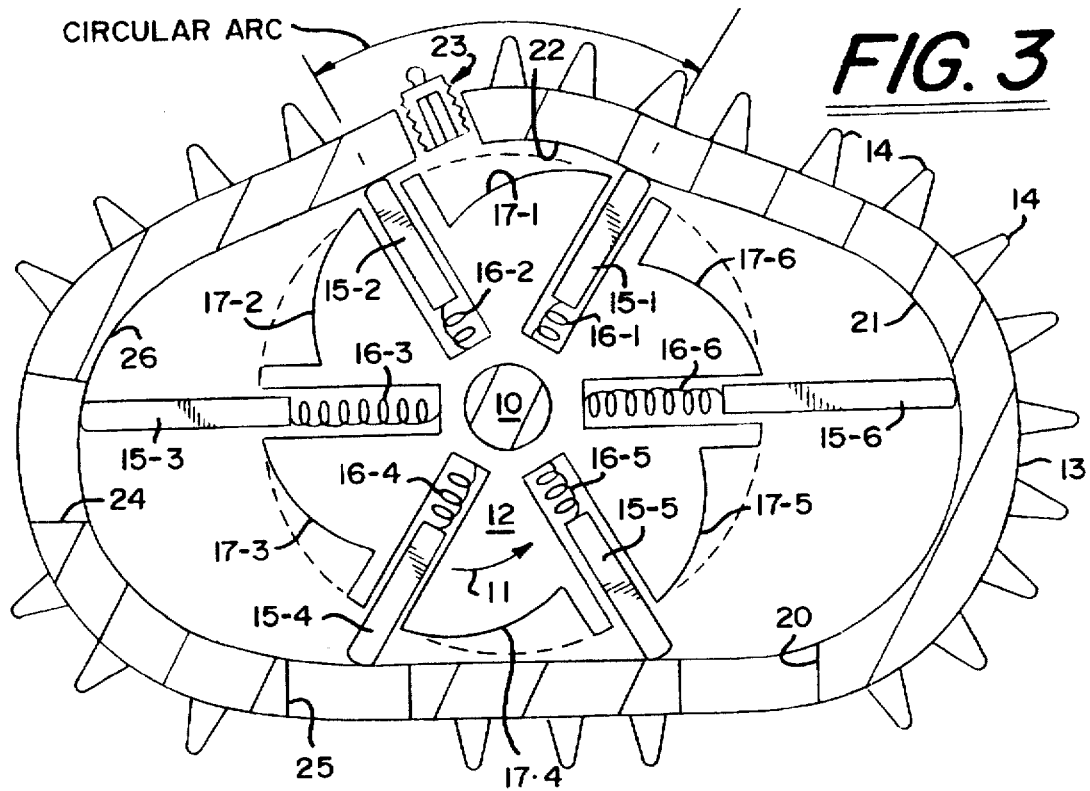
FIG. 3 is a theoretical explanation view of still another embodiment of the rotary engine according to this invention, in which the rotor has six sealing blades.

FIGS. 2 shows an embodiment of the rotary engine according to this invention, which has four sealing blades 15-1, 15-2, 15-3 and 15-4 separated approximately 90 degrees between two adjacent sealing blades. It is apparent that the explosion cycles are carried out 4 times during a revolution of the rotor 12. FIGS. 3 shows an embodiment of the rotary engine according to this invention, which has the rotor 12 with six sealing blades 15-1, 15-2, 15-3, 15-4, 15-5 and 15-6 separated approximately 60 degrees between two adjacent sealing blades. It is apparent that the explosion cycles are carried out 6 times during a revolution of the rotor 12. Incidentally, in the embodiment shown in FIG. 2, the auxiliary exhaust port 25 as provided in the embodiments in FIGS. 1 and 3 is omitted.

Figure 4:
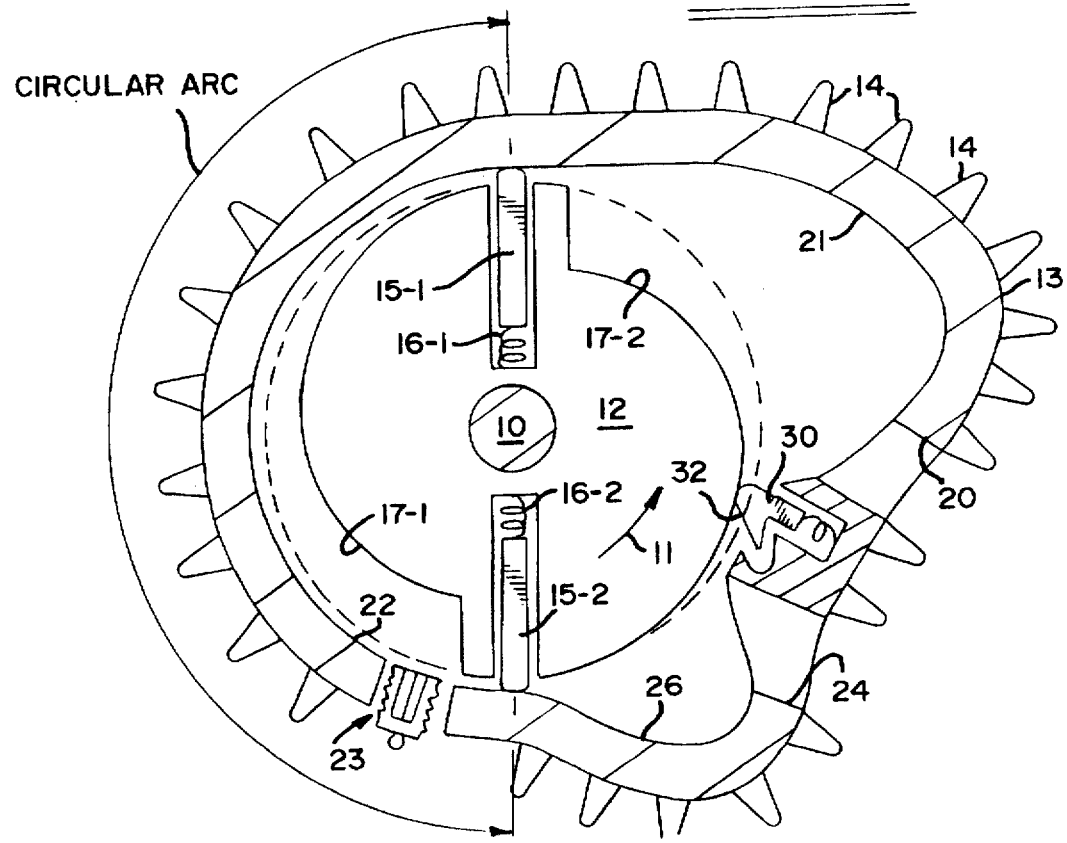
FIG. 4 is a theoretical explanation view of yet another embodiment of the rotary engine according to this invention, in which the rotor has two sealing blades.

FIG. 4 shows an embodiment of the rotary engine according to this invention in which the rotor 12 has two sealing blades 15-1 and 15-2 separated 180 degrees therebetween so that two explosion cycles are made during a revolution of the rotor. In the embodiment shown in FIG. 4, the rotor housing 13 is provided with a sealing blade 30 elastically biased toward the circumference surface of the rotor 12. Please note that it is not needed to arrange the sealing blade 30 as the telescopic construction. This sealing blade 30 acts to separate the mixture suction and compression engine room from the combustion gas diffusion and exhaust engine room in an airtight manner. In order to make smooth the touch of the rotor sealing blades 15 to the rotor housing sealing blade 30, there is provided a blade guide surface 32 on the rotor housing sealing blade 30.

While the rotor 12 rotates, after one rotor sealing blade 15 passed through the rotor housing sealing blade 30, negative pressure produced at the downstream side of that rotor sealing blade sucks up fuel mixture through the mixture suction port 20. After the second rotor sealing blade passed through the suction port 20, the mixture between the first and second rotor sealing blades is gradually compressed. When the maximum compression of the fuel mixture was obtained in the condition shown in FIG. 4 in which the rotor sealing blades 15-2 and 15-1 are brought into the maximum contraction state, the ignition, that is explosive combustion of the fuel is made. By the sliding of the first sealing blade 15-2 along the diffusion wall 26 and its passing through the combustion gas exhaust port 24, the combustion gas is diffused and exhausted.

Figure 5:
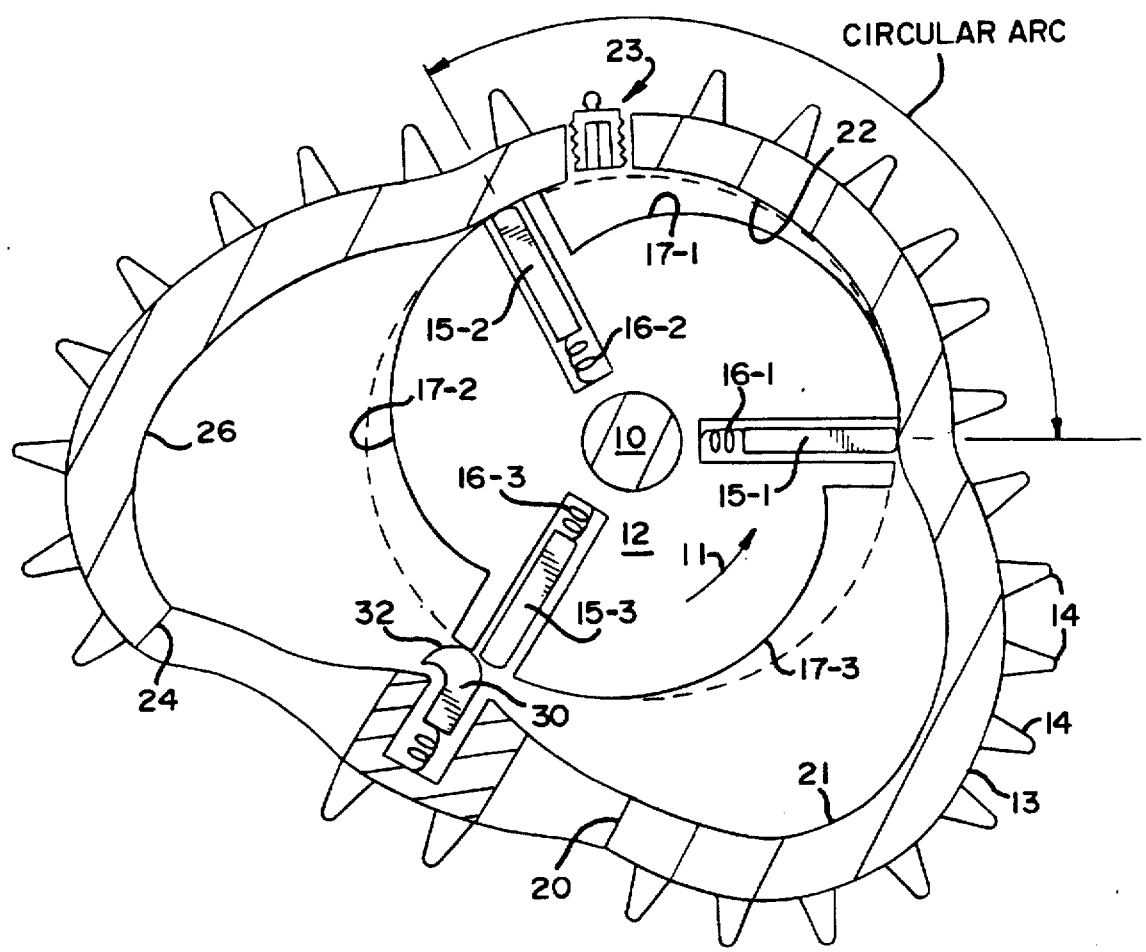
FIG. 5 is a theoretical explanation view of yet another embodiment of the rotary engine according to this invention, in which the rotor has three sealing blades.

FIG. 5 shows an embodiment of this invention in which the rotor 12 has three angularly equally spaced sealing blades 15-1, 15-2 and 15-3 as well as three notches 17-1, 17-2 and 17-3 between two adjacent sealing blades. The operation of this embodiment is substantially the same as that of the embodiment shown in FIG. 4 except the former carries out three explosion cycles during a revolution of the rotor 12.

Figure 6:
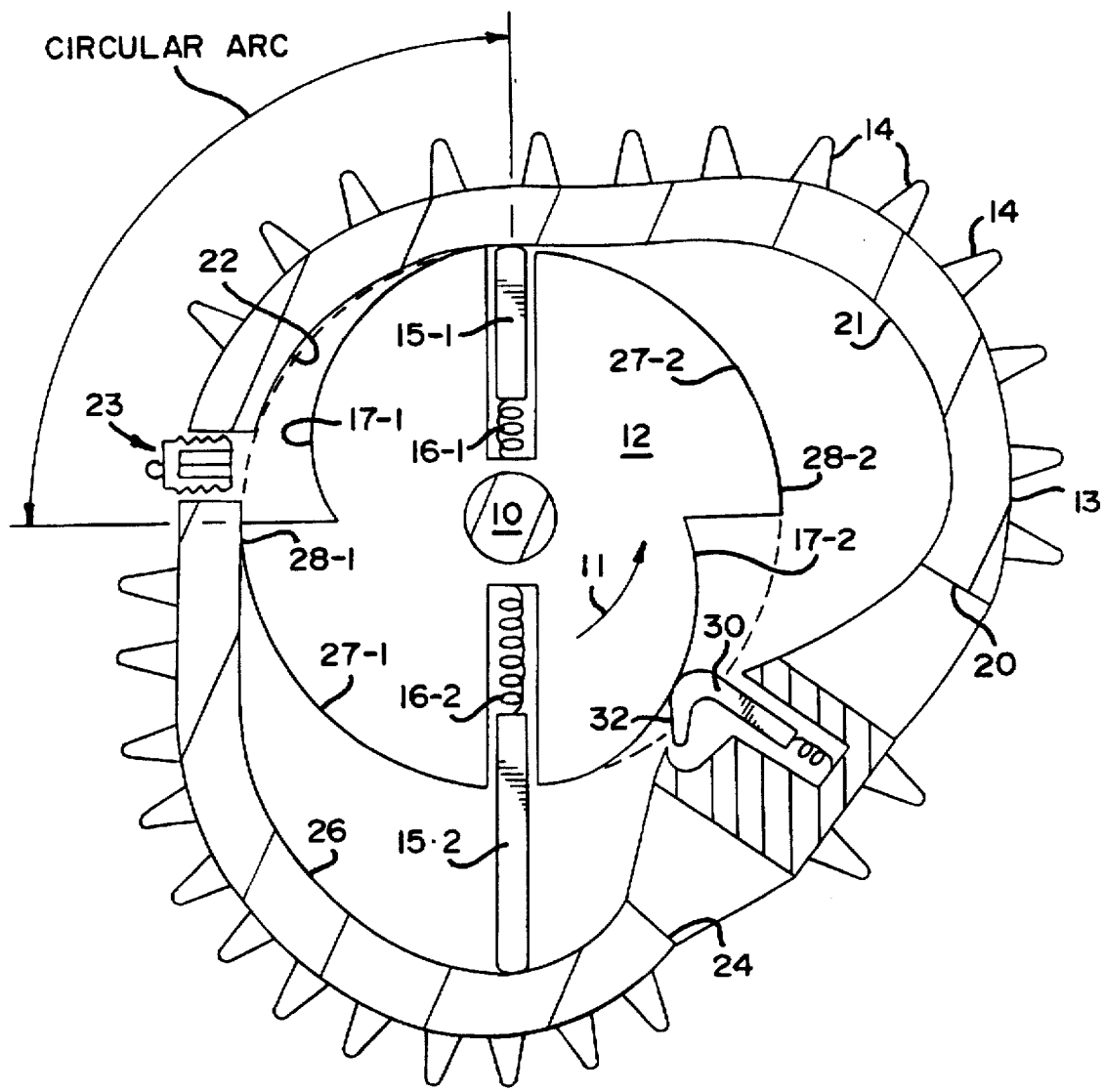
FIG. 6 is a theoretical explanation view of a modification of the embodiment shown in FIG. 4, in which the rotor has two sealing blades.

The embodiments shown in FIGS. 1 through 5 relate to the arrangement in which the combustion engine room is formed by the two sealing blades positioned substantially at the both ends of the arc portion 22 in their maximum contraction state, whereas FIG. 6 shows an arrangement in which the combustion engine room is defined by one sealing blade 15 positioned substantially at one end of the arc portion 22 in the maximum contraction condition and the airtight contact of a portion 28-1 or 28-2 on the circular portion 27-1 or 27-2, respectively of the rotor 12 to the other end of the arc portion 22. In a preferred embodiment, at least the portions 28 on the circular portions 27 of the rotor 12 provide airtight between the portions 28 and the arc portion 22 when the portions 28 slide along the arc portion. In FIG. 6, the rotor 12 has the circular portions 27-1, 27-2 upstream in the rotating direction of the rotor 12 and notches 17-1, 17-2 downstream in the rotating direction of the rotor 12, respectively between the two sealing blades 15-1 and 15-2.

Figure 7:
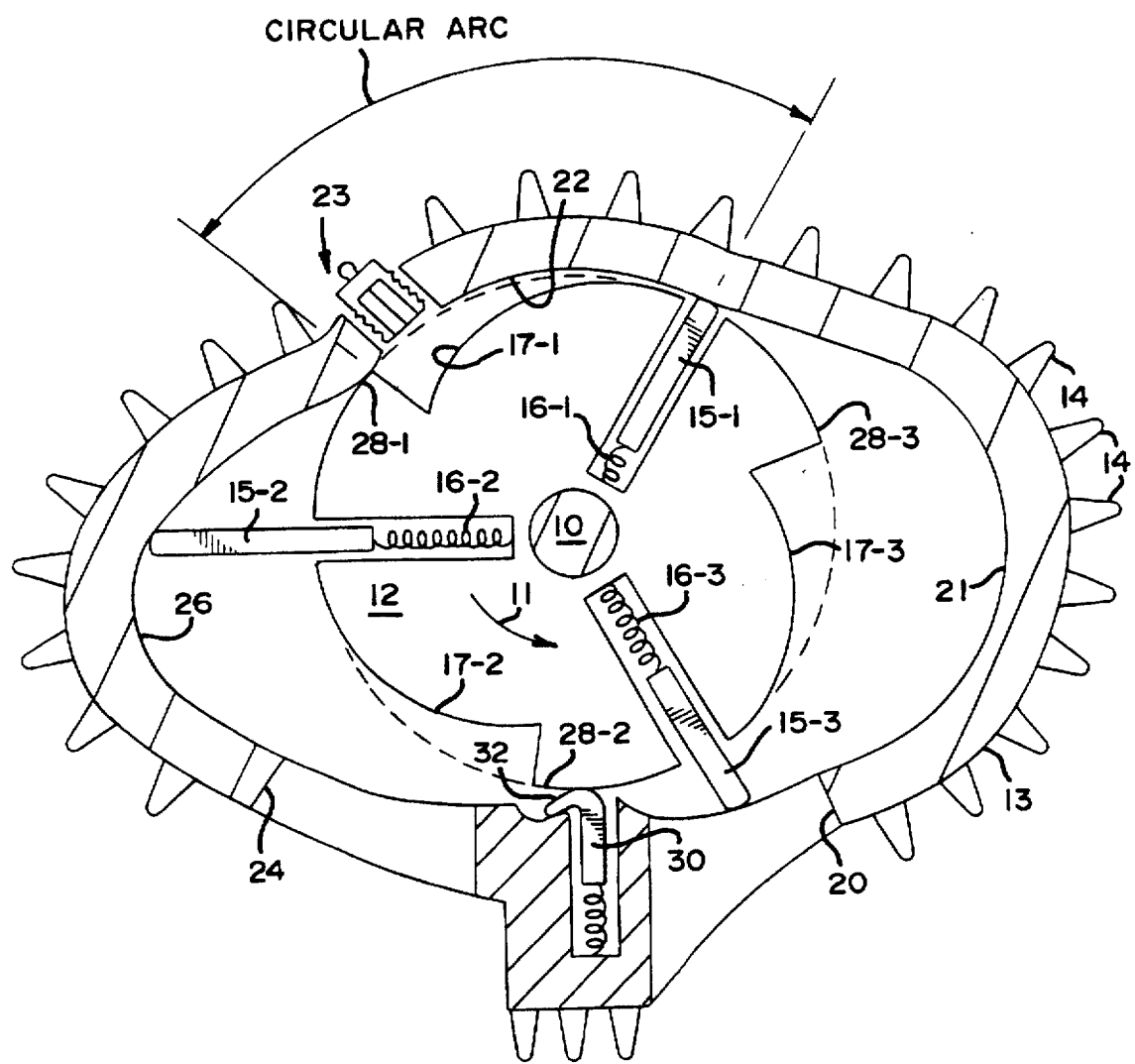
FIG. 7 is a theoretical explanation view of a modification of the embodiment shown in FIG. 5, in which the rotor has three sealing blades.

After the sealing blade 15-2 slides through the mixture suction port 20, during the compression cycle thereafter, the sucked fuel mixture is compressed between the airtight contact of the portion 28-2 on the rotor circular portion 27-2 to the arc portion 22 and the sealing blade 15-2. In the final compression position, that is the maximum compression position, the portion 28-2 on the rotor circular portion 27-2 is positioned on the arc portion 22 near its one end in the airtight condition and at the same time the sealing blade 15-2 is positioned also on the arc portion 22 at the other end in the maximum contracted state. In this condition, the engine combustion room is formed and the ignition is executed. During these compression and explosion cycles, the airtight contact of the portions 28 on the rotor circular portions 27 to the rotor housing arc portion 22 is the same in function as the preceding one of the two adjacent sealing blades as in the cases in FIGS. 1 through 5. In an embodiment shown in FIG. 7, there are provided three sealing blades and three notches, but its operation is substantially the same as that of the embodiment in FIG. 6.

Figure 8:
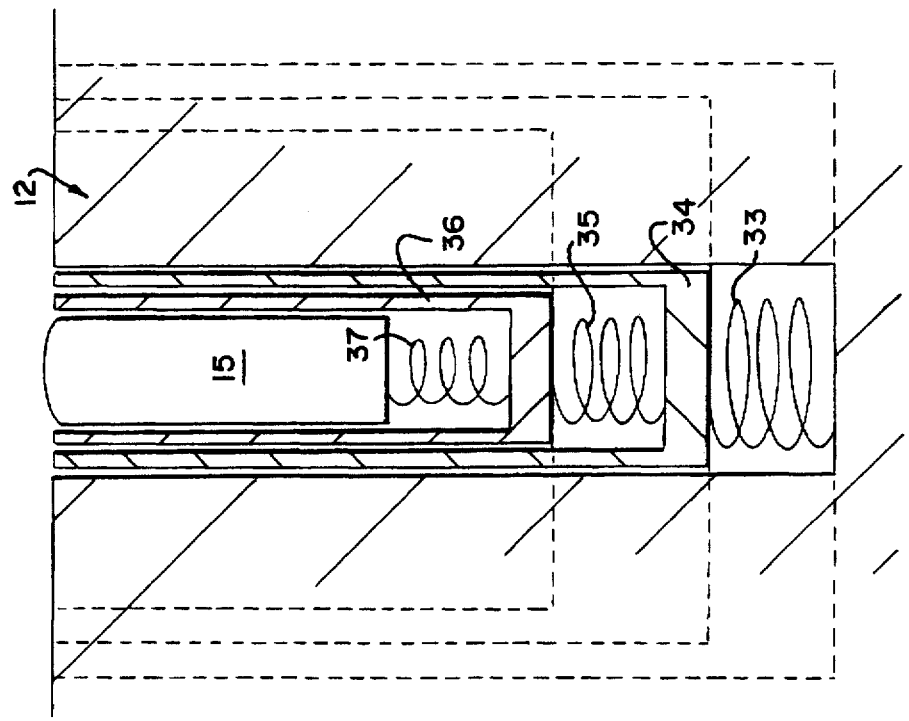
FIG. 8 is a sectional view of a sealing blade which may be used in the rotary engine of this invention.

FIGS. 8 shows in detail an embodiment of the telescopic sealing blade 15 of the rotor 12 as used in the above-mentioned embodiments and its attachment to the rotor. A sealing blade body 15 is accommodated or contained within a first sealing blade case 36 and spring means such as a coil spring 37 is provided between the lower end of the sealing blade 15 and the bottom of the first case 36. A plurality of coil springs 37 may be arranged at intervals in the axial direction of the rotor 12. The first case 36 is telescopically accommodated within a second sealing blade case 34. A coil spring 35 is provided between the lower end of the first case 36 and the bottom of the second case 34. A plurality of coil springs 35 may be arranged at intervals in the axial direction of the rotor 12. The second case 34 is accommodated within the opening of the rotor 12 through a spring 33. A plurality of coil springs 33 may be arranged at intervals in the axial direction of the rotor 12. An airtight construction is provided between the sealing blade body 15 and the first case 36, between the first case 36 and second case 34 and between the second case 34 and the opening of the rotor 12 in the well-known manner. Therefore, a sealing blade deflation arrangement is needed for the expansion and contraction of the sealing blade. The structure shown in FIG. 8 by which the sealing blade 15 is elastically pressurized toward the inner surface of the rotor housing 13 in the longitudinal direction can provides longer expansion for the sealing blade.

Figure 9:
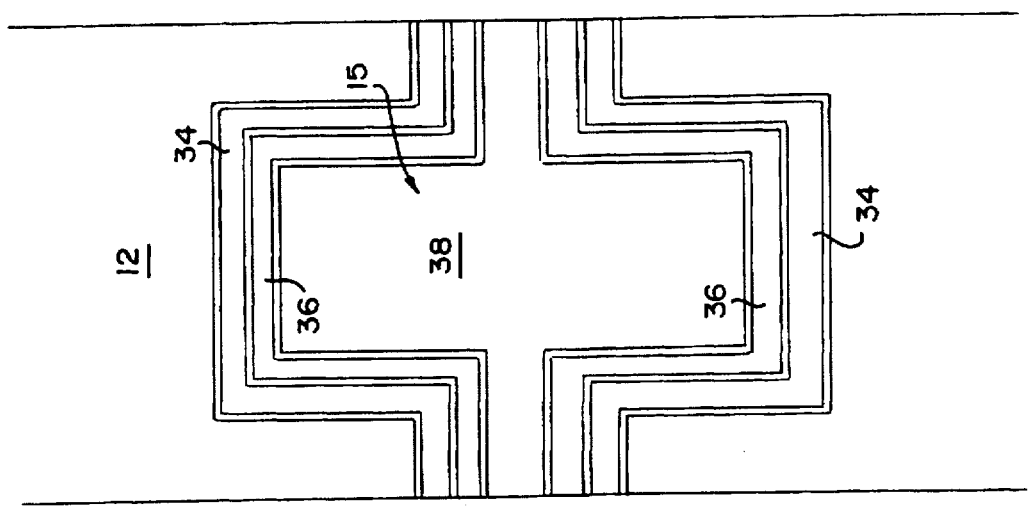
FIG. 9 is a top view of the sealing blade shown in FIG. 8.

FIG. 9 shows a sealing blade 15 of which mechanical strength is reinforced in the rotating direction 11 of the rotor 12. To this end, the sealing blade 15 has its portion 38 of which width is expanded in the rotating direction of the rotor 12. In the Figure, although the shape of the portion 38 of the sealing blade 15 is a rectangle which is longer in the rotating direction of the rotor 12, but any shape can be used for the reinforcement purpose. The cases 34 and 36 are reinforced alike by their corresponding shapes to the sealing blade.

Figure 10A:
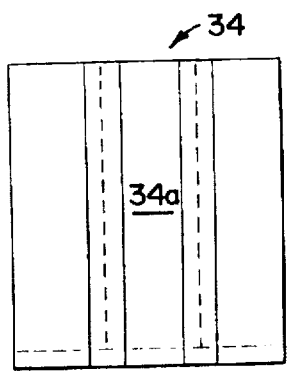
FIGS. 10A, 10B, 10C; 11A, 11B, 11C; and 12A, 12B, 12C show other views of the sealing blade shown in FIGS. 8 and 9.
Figure 11A:
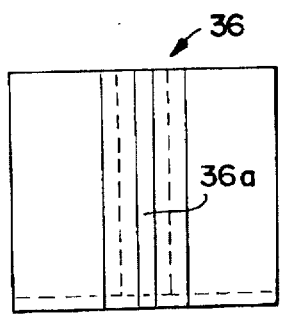
Figure 12A:
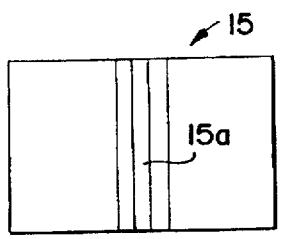
Figure 10B:
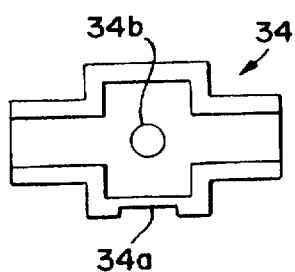
Figure 11B:
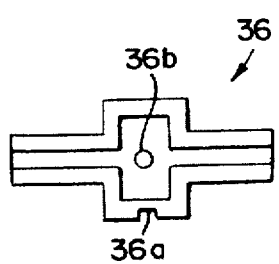
Figure 12B:
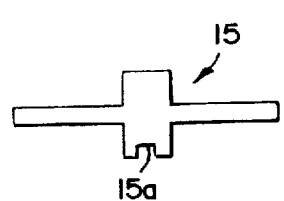
Figure 10C:
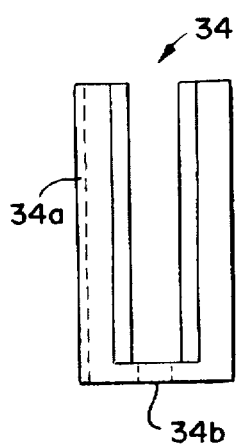
Figure 11C:
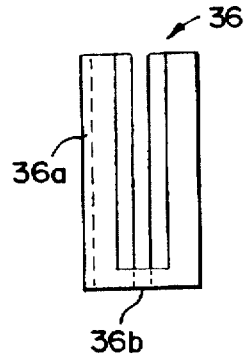
Figure 12C:
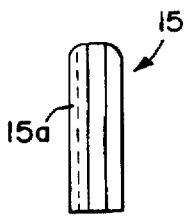

FIGS. 10A, 10B, 10C; 11A, 11B, 11C; and 12A, 12B, 12C show other views of the sealing blade shown in FIGS. 8 and 9. FIGS. 10A, 11A and 12A show side elevational views for the outer sealing blade case 34, inner sealing blade case 36 and sealing blade body 15, respectively. FIGS. 10B, 11B and 12B show plan views for the outer sealing blade case 34, inner sealing blade case 36 and sealing blade body 15, respectively, as shown in FIG. 9. FIGS. 10C, 11C and 12C show other side elevation views for the outer sealing blade case 34, inner sealing blade case 36 and sealing blade body 15, respectively. The space in which the spring 33 exists is communicated to the outside (engine room) through a groove 34a formed in the outer sealing blade case 34, the space in which the spring 35 exists is communicated to the outside through a groove 36a formed in the inner sealing blade case 36, and the space in which the spring 37 exists is communicated to the outside through a groove 15a formed in the sealing blade body 15. Openings 34b and 36b provided in the bottoms of the sealing blade cases 34 and 36, respectively may be used instead of the grooves 34a and 36a, respectively.

Figure 13:
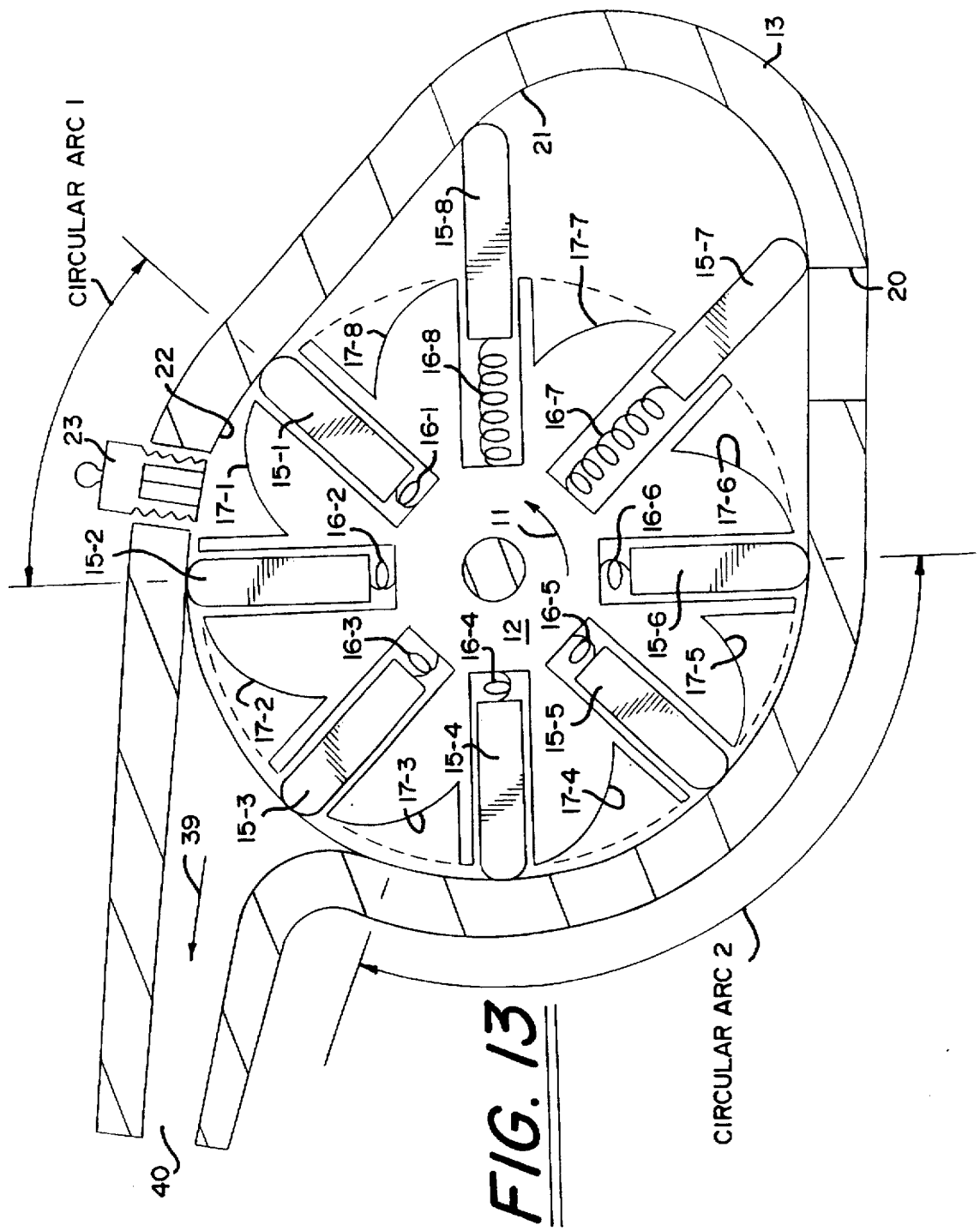
FIG. 13 is a theoretical explanation view of a rotary jet engine according to this invention.

The principle of this invention is applicable not only to the above-mentioned mechanism in which the explosive combustion energy is converted to the rotary movement of the rotor and its rotary torque is used to any external utilization apparatus but also to a jet propulsion system in which the explosive combustion energy is used directly to propulsion force due to jet stream. FIG. 13 shows a theoretical explanation view of the rotary jet engine according this invention. This rotary jet engine is provided with eight sealing blades 15-1 to 15-8 which are attached on the rotor 12 in the above-mentioned manner and eight notches 17-1 to 17-8 between two adjacent sealing blades which are provided in the rotor 12 in the above-mentioned manner. The operation and function of these sealing blades and notches are the same as those in the above-mentioned embodiment. The rotor 12 is rotatably supported within the rotor housing 13 which may be cooled in a well-known manner. In this embodiment, when a leading sealing blade 15-2 and a following sealing blade 15-1 are brought to the positions shown in the Figure, fuel gas is accommodated with its maximum pressure condition within the engine combustion room substantially defined by the notch 17-1 between the sealing blades 15-2 and 15-1 and a first circular arc section (arc 1) 22 of the inner wall of the rotor housing 13, and at that time firing or ignition is carried out by the ignition plug 23. Then, due to rotation of the rotor, burnt gas jets out in the direction shown by an arrow 39 and goes out from a jet stream ejection port 40. This jet stream is used as jet propulsion force. An increased number of rotation of the rotor can provide substantially continuous jet stream. In the illustrated embodiment, on the inner wall of the rotor housing 13 a second circular arc section (arc 2) is provided beside the first circular arc section which defines the engine combustion room together with the notch. Please note that the sealing blades which have gone out from the first arc section do nothing for the engine operations until they go out from the second arc section. The mixture suction port 20 is so positioned and sized that a sealing blade, after has gone out from the second arc section and then passed through the mixture suction port 20, can suck fuel mixture gas through the mixture suction port 20 as much as possible until a next sealing blade passes through the suction port 20. Since neither special gas turbine for the compression nor turbine for obtaining power for driving the compressor turbine is necessary for the rotary jet engine of this invention, it can obtain excellent fuel efficiency in comparison with prior art jet engines and its structure is very simple.

Figure 14:
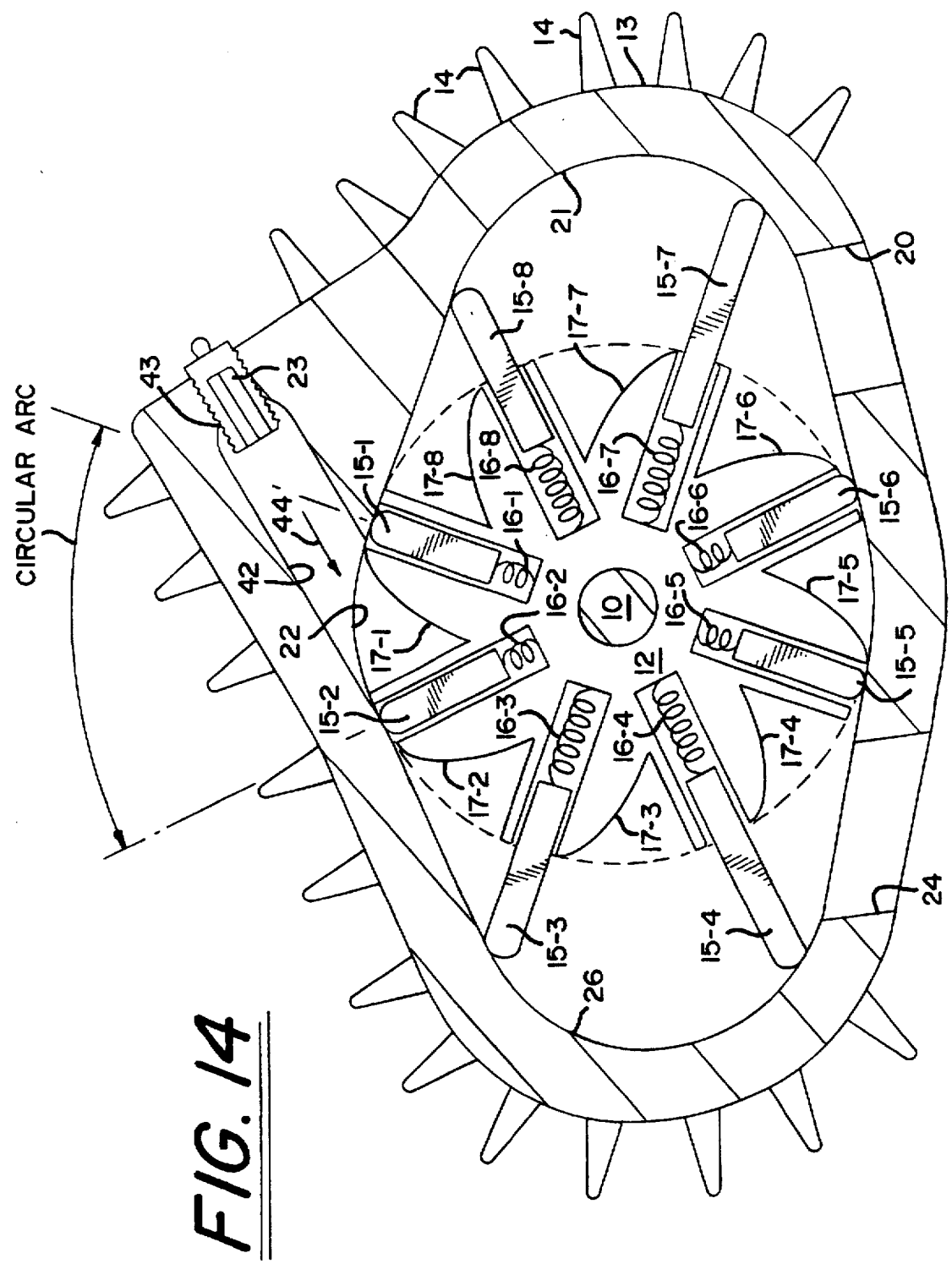
FIG. 14 is a theoretical explanation view of a rotary engine incorporating therein an important characteristic feature of this invention.

FIG. 14 shows an embodiment of this invention in which it accomplishes extremely high efficient conversion of explosion energy to rotor rotating energy by the provision of means for producing burnt gas blast directed along one direction during the engine explosion cycle, which burnt gas blast is received by the above-mentioned burnt gas pressure bearing surface of the notch at a right angle. This means includes a blast guide hole 42 formed in the rotor housing inner wall portion 22 and which opens to the engine combustion room. This means also includes a sparking plug 23 mounted at the end 43 at which the blast guide hole is terminated. The length of the blast guide hole 42 from the end thereof to the position of the hole opening from which the blast goes out must be enough for the blast to be directed along the one direction. In the light of the fact that it is desirable that the volume of the engine combustion room is made smaller to obtain a sufficient compression ratio, it is preferable to make its length shorter.

Also, in accordance with the invention, it is possible to obtain the burnt gas blast directed along one direction with the blast guide hole 42 having its smaller length. To this end, the shape of the end 43 of the blast guide hole 42 at which the spark plug 23 is mounted is made to a parabolic shape or a shape similar thereto, of which focal point is positioned substantially to the sparking point of the sparking plug 43. As a result, blast produced by the ignition of the spark plug 23 is guided effectively within the hole 42 in the direction 44, and collided with the burnt gas pressure bearing surface of the notch. It is preferable that the direction 44 of the blast is perpendicular to the burnt gas pressure bearing surface. This arrangement provide higher efficient rotary force for the rotor. The blast guide hole 42 may have any cross-sectional shape as long as it can guide the blast and determine the direction thereof.

It should be understand that although preferred embodiments of this invention have been illustrated and described, various modifications thereof will become apparent to those skilled in the art. For example, although in the drawings the single mixture suction port 20 was shown, a plurality of mixture suction ports 20 may be provided at intervals in the axial direction of the rotor 12. Also, a plurality of combustion gas exhaust ports may be provided at intervals in the axal direction of the rotor. Further, in case where many sealing blades are used, it is possible to divide the engine compression, combustion and combustion gas diffusion rooms by one or more airtight bulkheads arranged at intervals in the axal direction of the rotor 12 to provide plural parallel engine arrangement.

What is claimed is:

1. A rotary engine comprising:

a rotor housing having an engine inner wall defining an inner engine room;

a rotor rotatably mounted within said engine room in said rotor housing, the gap between said rotor and said engine inner wall of said rotor housing defining the engine room;

a plurality of sealing blades attached at equally spaced positions on said rotor, said sealing blades being biased to contact to the engine wall of said rotor housing to divide the engine room into the plurality of compartments, each said sealing blade includes a sealing blade body contained in a sealing blade case and being spring biased toward said engine inner wall of said rotor housing, said sealing blade case being contained in said rotor and being spring biased in a radial direction with respect to the rotor and including a plurality of sealing blade case parts assembled into a telescopic construction in which said sealing blade case parts are spring biased with respect to each other, said sealing blade case parts including an inner sealing blade case part supporting said sealing blade body therein, said sealing blade body being spring biased with respect to said inner sealing blade case part, and an outer sealing blade case part supporting said inner sealing blade case part therein, said inner sealing blade case part being spring biased with respect to said outer sealing blade case part;

a notch provided on said rotor between adjacent sealing blades and defined by walls, such that a plurality of notches are formed on said rotor;

a profile of said engine inner wall of said rotor housing along which said sealing blades slide as said rotor rotates being configured so that during a suction cycle of the rotary engine during which fuel gas is sucked into the engine room between adjacent sealing blades, a first sealing blade elongates gradually from its passage through a fuel gas suction port provided in said engine wall to the passage of a following sealing blade through said fuel gas suction port, so that during a compression cycle of the rotary engine, these two sealing blades gradually shorten to gradually compress the fuel gas accommodated therebetween, and so that during an ignition cycle of the rotary engine, said two sealing blades are shortened to a maximum condition to accommodate the fuel gas within a combustion room of the rotary engine defined substantially by said engine inner wall and the notch between said two sealing blades; and means for producing burnt gas blast directed along one direction toward one of the walls of the notch during the ignition cycle of the rotary engine, said means includes a blast guide hole formed in said rotor housing and a sparking plug mounted at an end of said blast guide hole at which said blast guide hole is terminated, said blast guide hole having a length from said end to the position of the blast guide hole from which a blast goes out which is sufficient for the blast to be directed along said one direction.

2. The rotary engine of claim 1 wherein a surface at the end of said blast guide hole at which said sparking plug is mounted has a substantially parabolic shape of which focal point is positioned substantially to the sparking point of said sparking plug.

3. The rotary engine of claim 1, wherein a rotary shaft of said rotor is directly connected to an engine output shaft through which various utilization apparatuses can use the engine torque of the rotary engine.

4. The rotary engine of claim 1 wherein it further comprises a jet stream exhaust port provided in said engine inner wall, through which burnt gas is exhausted as substantially continuous jet stream immediately after the repeated and succeeding explosion cycles of the engine.

5. The rotary engine of claim 1, wherein each said sealing blade has a substantially rectangular cross-section in a plane perpendicular to the direction along which the sealing blade elongates and shortens, said rectangular cross-section including a larger width which is substantially normal to the rotating direction of said rotor and a shorter width which is substantially parallel to the rotating direction of said rotor.

said shorter width being partially enlarged for providing structural reinforcement of the sealing blade.

6. The rotary engine of claim 1, wherein the profile of said engine inner wall includes the portion defining said engine combustion room, across which said two adjacent sealing blades which are in their maximum shortened condition are engaged with said engine inner wall, is substantially a circular arc with respect to a plane perpendicular to a rotary axis of said rotor.

7. The rotary engine of claim 6, wherein a radius of said circular arc is substantially equal to a radius of rotation of said rotor, so that when said two sealing blades are in the maximum shortened condition, said two sealing blades are pushed in to a level of the rotor surface, and surface seals are formed between the positions on said rotor around said two respective sealing blades and the corresponding engaged portions on said engine inner wall of said rotor housing.

8. The rotary engine of claim 1, wherein the profile of said engine inner wall is further configured so that following the ignition cycle of the rotary engine the preceding one of said two sealing blades between which the engine combustion room is sandwiched elongates so that burnt gas is diffused in advance of an exhaust cycle of the rotary engine.

\* \* \* \* \*